US012689632B2

(12) United States Patent
Holst et al.

(10) Patent No.: US 12,689,632 B2
(45) Date of Patent: Jul. 21, 2026

(54) CAPTURING THE BEHAVIORAL SIGNATURE OF POLYMORPHIC MALWARE USING GENERATIVE AI

(71) Applicant: Cisco Technology, Inc., San Jose, CA (US)

(72) Inventors: Amanda L. Holst, Campbell, CA (US); Eugenia Kim, Allentown, PA (US); Myungjin Lee, Bellevue, WA (US)

(73) Assignee: Cisco Technology, Inc., San Jose, CA (US)

( * ) Notice: Subject to any disclaimer, the term of this patent is extended or adjusted under 35 U.S.C. 154(b) by 18 days.

(21) Appl. No.: 18/821,135

(22) Filed: Aug. 30, 2024

(65) Prior Publication Data

US 2026/0067295 A1      Mar. 5, 2026

(51) Int. Cl.
*H04L 9/40*          (2022.01)

(52) U.S. Cl.
CPC ...... *H04L 63/1416* (2013.01); *H04L 63/1425* (2013.01)

(58) Field of Classification Search
CPC ..................... H04L 63/1416; H04L 63/1425
See application file for complete search history.

(56) References Cited

U.S. PATENT DOCUMENTS

| | | | |
|---|---|---|---|
| 2015/0172300 A1* | 6/2015 | Cochenour | G06F 21/6218 726/23 |
| 2019/0199736 A1 | 6/2019 | Howard et al. | |
| 2019/0222585 A1 | 7/2019 | Apple et al. | |
| 2020/0076832 A1 | 3/2020 | Jusko et al. | |
| 2020/0204574 A1* | 6/2020 | Christian | G06F 18/23 |
| 2021/0144154 A1 | 5/2021 | Levy | |
| 2021/0273958 A1* | 9/2021 | McLean | H04L 63/1433 |
| 2023/0007042 A1* | 1/2023 | Haworth | H04L 63/205 |
| 2024/0291853 A1* | 8/2024 | Murphy | G06F 21/552 |
| 2025/0097246 A1* | 3/2025 | Benyo | H04L 63/1416 |

OTHER PUBLICATIONS

Divakaran D.M., et al., "LLMs for Cyber Security: New Opportunities", arXiv:2404.11338v1, Apr. 17, 2024, 10 Pages.
Gaber M.G., et al., "Malware Detection with Artificial Intelligence: A Systematic Literature Review", ACM Computing Surveys, Jan. 2024, vol. 56, No. 6, Article 148, 33 Pages.
Kasarapu S., et al., "Generative AI-Based Effective Malware Detection for Embedded Computing Systems", arXiv:2404.02344v2, Apr. 12, 2024, 8 Pages.
NTT Security Holdings: "How Does XDR Help Defend Against Polymorphic Malware?", Samurai, Mar. 30, 2023, pp. 1-4.
Plate H., "LLM-Assisted Malware Review: AI and Humans Join Forces to Combat Malware", Endor Labs, Apr. 17, 2023, Retrieved from https://www.endorlabs.com/learn/llm-assisted-malware-review-ai-and-humans-join-forces-to-combat-malware on Jun. 5, 2024, pp. 1-9.
Sabeel U., "DL-Based Defense Against Polymorphic Network Attacks", OntarioTech University, Jan. 2024, 240 Pages.

* cited by examiner

*Primary Examiner* — Frantz B Jean

(74) *Attorney, Agent, or Firm* — Merchant & Gould P.C.; Kenneth J. Heywood

(57) ABSTRACT

In one implementation, a device captures behavioral snapshots of a piece of executable code. The device generates a prompt based on the behavioral snapshots. The device generates a malware signature for the piece of executable code in part by inputting the prompt into a generative model. The device provides the malware signature for use to detect malware.

20 Claims, 10 Drawing Sheets

300

Generative Model 308

Prompt 304

Output 306

302

510

Prompt Generator 406

Behavioral Snapshots 512

Sandbox Snapshot Agent 404

Anomalous Source Code 506

Behavioral Snapshot 512a

Time 514a

Behavioral Snapshot 512b

Time 514b

Behavioral Snapshot 512n

Time 514n

520

Malware Signature 526

Signature Generator 408

Prompt 522

Ex. – "Given the following behavioral patterns, can you build a correlation between the following two changes?"

User Interface 524

Prompt Generator 406

Behavioral Snapshots 512

Malware
Signature
526

Embedding
Model
602

Vector
Embeddings
604

Vector
Database
606

Query
610

Application
608

Response
612

700

705 Start

710 Capture Behavioral Snapshots of Code

715 Generate Prompt from Snapshots

720 Generate Malware Signature

725 Provide Malware Signature for Detection

730 End

CAPTURING THE BEHAVIORAL SIGNATURE OF POLYMORPHIC MALWARE USING GENERATIVE AI

TECHNICAL FIELD

The present disclosure relates generally to computer networks and more particularly to capturing the behavioral signature of polymorphic malware using generative artificial intelligence (AI).

BACKGROUND

Malware represents a persistent threat to computer networks and devices. Indeed, malicious actors often promulgate malware for purposes such as exfiltrating sensitive data, causing system disruptions, launching denial of service (DoS) attacks, among others. To this end, enterprises now employ various anti-malware measures such as endpoint malware detectors and traffic analyzers whose goal is to prevent the spread of malware in the network.

Traditionally, anti-malware measures have centered on first learning the behavioral signature of the malware and then looking for a match on the local device or in the network. For instance, infected devices in a distributed DoS (DDoS) attack often exchange command and control (C&C) traffic with a malicious controller. Knowing the pattern of this traffic can aid an anti-malware service to block this traffic in the network and identify the infected devices.

Recently, a new threat with respect to malware has emerged: polymorphic malware that is able to change its code, and thus its behavior, over time. Because of these changes, polymorphic malware is able to avoid detection by anti-malware measures that rely on static signatures. Identifying the polymorphic signature of this type of malware, though, remains a challenge for network security personnel and can mean that the same type of malware continues to reemerge as a threat.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device captures behavioral snapshots of a piece of executable code. The device generates a prompt based on the behavioral snapshots. The device generates a malware signature for the piece of executable code in part by inputting the prompt into a generative model. The device provides the malware signature for use to detect malware.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
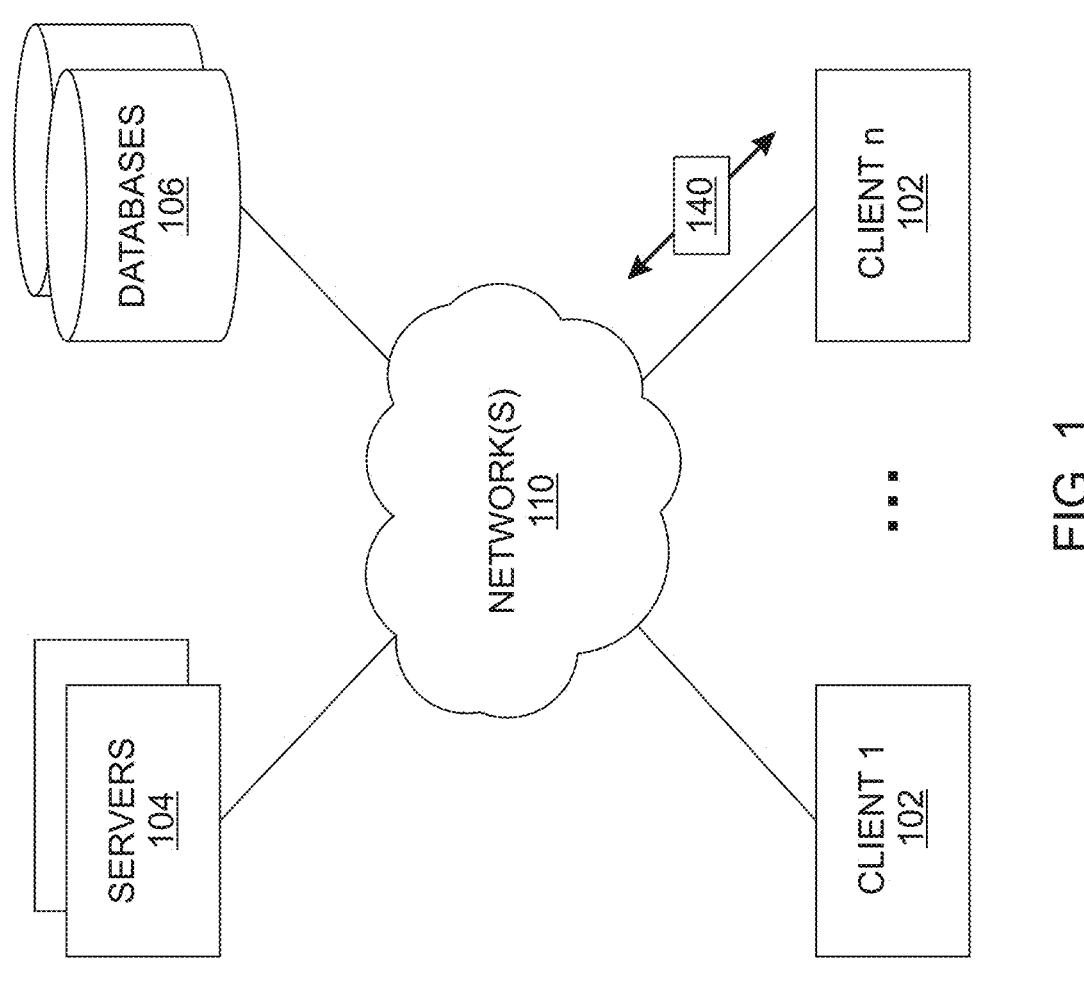

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on Wi-Fi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110. Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
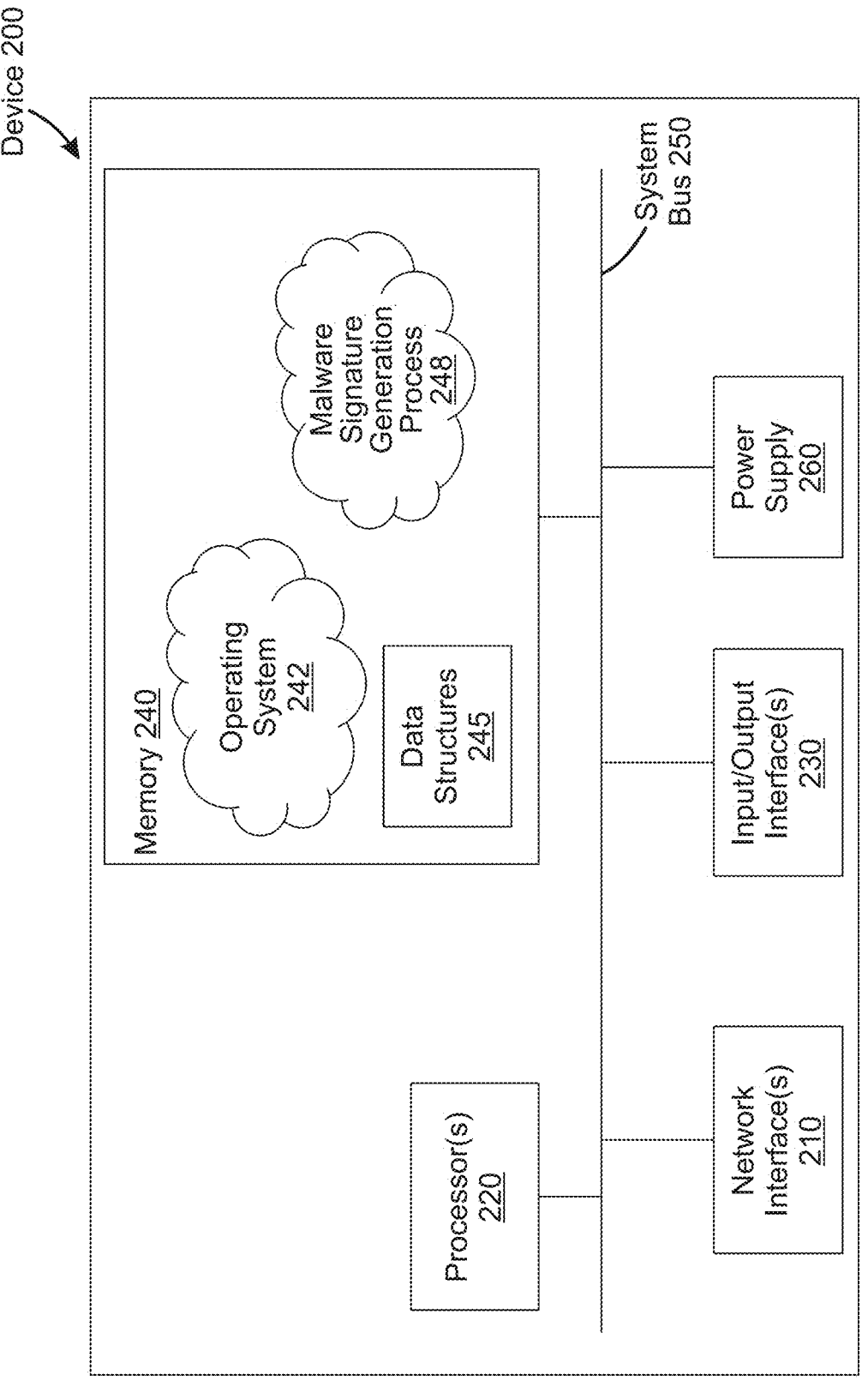
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a malware signature generation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, malware signature generation process 248 may include computer executable instructions that, when executed by processor 220, cause device 200 to perform the techniques described herein. To do so, in some implementations, malware signature generation process 248 may utilize and/or be a component of an artificial intelligence (AI)/machine learning system. In general, AI/machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, malware signature generation process 248 may include one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the malware signature generation process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, malware signature generation process 248 may also include, or otherwise use or be employed to operate with, one or more generative AI/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of machine unlearning, malware signature generation process 248 may be a component of, use, and/or be utilized in the management of prompts/access to a generative model to perform layer attribution, perform layer sensitivity assessment, remove capabilities from a previously trained model, retain model performance, etc. based on a conversational input from a user (e.g., voice, text, etc.). Example generative approaches can include, but are not limited to, generative adversarial networks (GANs), large language models (LLMs), other transformer models, diffusion models, and the like.

The performance of an AI/machine learning model can be evaluated in a number of ways based on the number of true positives, false positives, true negatives, and/or false negatives of the model. For example, consider the case of a model that predicts whether the QoS of a network path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
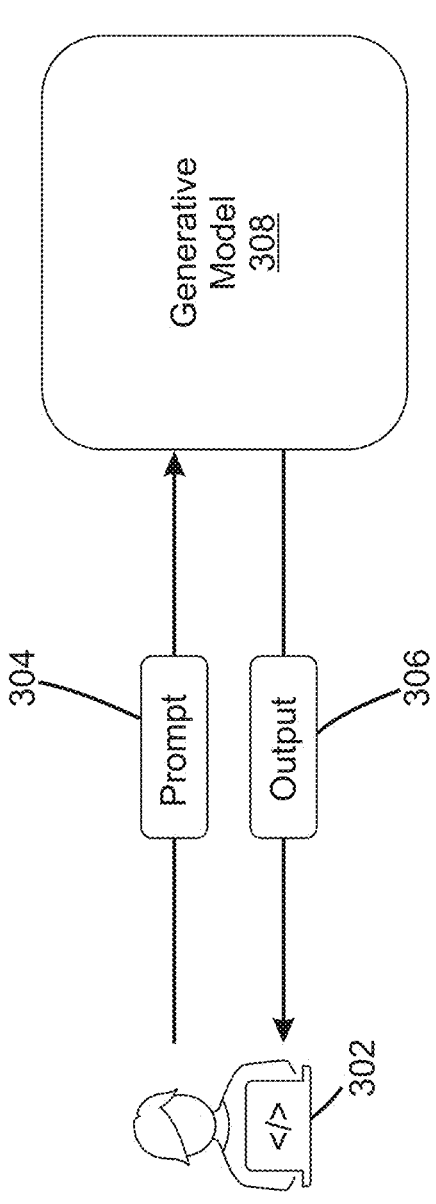
FIG. 3 illustrates an example of interfacing with a generative artificial intelligence (AI) model.
Figure 3:

FIG. 3 illustrates an example 300 for interfacing with a generative AI model, in various implementations. In example 300, a user 302 may send a prompt 304 (e.g., a query, a query augmented with additional data, documents, and/or images, etc.) to a generative model 308. The generative model 308 may be configured to process a prompt 304 to generate an output 306 to satisfy the prompt 304.

The generative model 308 may be a model configured to apply its trained algorithms to generate a response (e.g., output 306) based on the prompt 304 provided. For instance, in some cases, generative model 308 may take the form of a large language model (LLM), diffusion-based model, combinations thereof, or the like.

The output 306 may be the result produced by the generative model 308 (e.g., by the application of the generative model 308 to the prompt 304). This output can vary depending on the model's configuration and the task at hand. For example, the output 306 may include one or more of a generated and/or synthesized image, a text response, a classification and/or prediction, audio, video, combinations thereof, or the like.

As noted above, malware represents a persistent threat to computer networks and devices. Indeed, malicious actors often promulgate malware for purposes such as exfiltrating sensitive data, causing system disruptions, launching denial of service (DoS) attacks, among others. To this end, enterprises now employ various anti-malware measures such as endpoint malware detectors and traffic analyzers whose goal is to prevent the spread of malware in the network.

Traditionally, anti-malware measures have centered on first learning the behavioral signature of the malware and then looking for a match on the local device or in the network. For instance, infected devices in a distributed DoS (DDoS) attack often exchange command and control (C&C) traffic with a malicious controller. Knowing the pattern of this traffic can aid an anti-malware service to block this traffic in the network and identify the infected devices.

Recently, a new threat with respect to malware has emerged: polymorphic malware that is able to change its code, and thus its behavior, over time. Because of these changes, polymorphic malware is able to avoid detection by anti-malware measures that rely on static signatures. Identifying the polymorphic signature of this type of malware, though, remains a challenge for network security personnel and can mean that the same type of malware continues to reemerge as a threat.

Capturing the Behavioral Signature of Polymorphic Malware Using Generative AI The techniques herein introduce a framework to generate a signature for polymorphic malware that captures its various potential behaviors. In doing so, the resulting signature is more robust and able to detect a particular type of malware, even when it alters its behaviors. In some aspects, the techniques herein leverage generative AI to capture, and potentially expand, upon the behaviors of the malware, to produce an augmented signature for the malware.

Illustratively, the techniques described herein may be performed by hardware, software, and/or firmware, such as in accordance with malware signature generation process 248, which may include computer executable instructions executed by the processor 220 (or independent processor of interfaces 210) to perform functions relating to the techniques described herein.

Specifically, according to various implementations, a device captures behavioral snapshots of a piece of executable code. The device generates a prompt based on the behavioral snapshots. The device generates a malware signature for the piece of executable code in part by inputting the prompt into a generative model. The device provides the malware signature for use to detect malware.

Figure 4:
FIG. 4 illustrates an example architecture for capturing the behavioral signature of polymorphic malware using generative AI.
Figure 4:
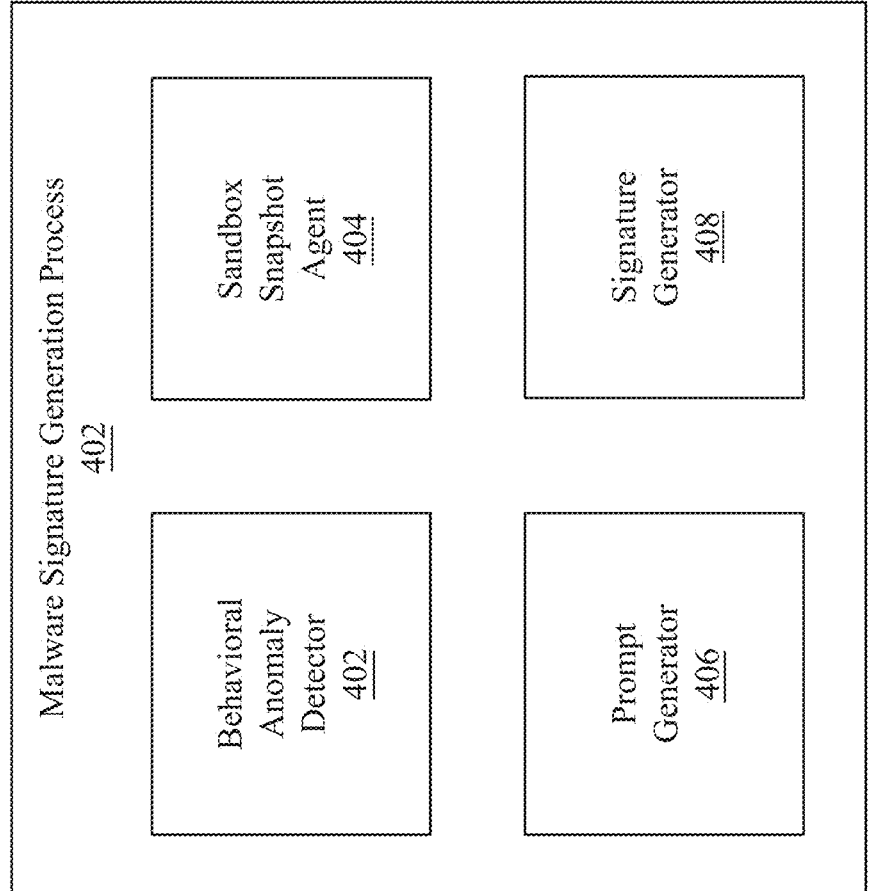

Operationally, FIG. 4 illustrates an example architecture 400 for capturing the behavioral signature of polymorphic malware using generative AI, in various implementations. At the core of architecture 400 is malware signature generation process 248, which may be executed by a controller for a network, a networking device, a sever, an endpoint, or the like (e.g., a device 200).

As shown, malware signature generation process 248 may include any or all of the following components: a behavioral anomaly detector 402, a sandbox snapshot agent 404, a prompt generator 406, and/or a signature generator 408. In various implementations, the functionalities of these components may be combined or omitted, as desired. In addition, these components may also be executed on a singular device or in a distributed manner. In cases in which they are executed in a distributed manner, the set of executing devices may also be viewed as a singular executing device for purposes of the teachings herein.

Figure 5A:
FIGS. 5A-5D illustrate examples of the functions and interactions of the components from FIG. 4.
Figure 5A:
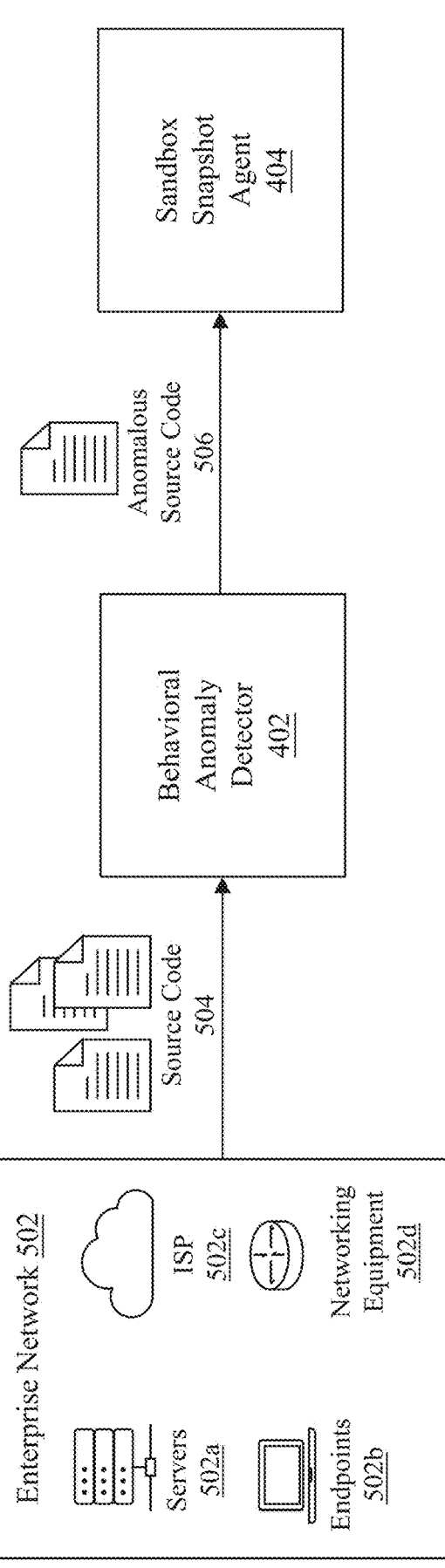

To better illustrate the functions and interactions of the components of malware signature generation process 248 in FIG. 4, FIGS. 5A-5D show examples of each of these components during execution. For instance, FIG. 5A illustrates an example of behavioral anomaly detector 402 identifying anomalous source code within an enterprise network 502.

As would be appreciated, enterprise network 502 may include various entities such as servers 502a, endpoints 502b, Internet Service Providers such as ISP 502c, networking equipment 502d, and the like. Accordingly, any of these entities may execute source code 504 (e.g., firmware, application software, scripts, etc.). To this end, behavioral anomaly detector 402 may assess source code 504 and their behaviors, to identify a particular source code 504 as being anomalous, i.e., to identify anomalous source code 506 within enterprise network 502 that is behaving anomalously.

The behaviors of source code 504 may take various forms such as any or all of the following:

Making filesystem changes on its executing device (e.g., deleting or replacing a file, renaming a file, accessing a file, etc.).

Making memory access calls on the local device

Sending traffic via enterprise network 502

Controlling a physical process (e.g., controlling an actuator such as a fan, industrial equipment, etc.)

Reporting telemetry

Etc.

To capture such behaviors, behavioral anomaly detector 402 may be hosted by the same entity that executes source code 504 (e.g., an endpoint, server, etc.), a network traffic analyzer in enterprise network 502, or another device that receives data indicative of any or all of the above behaviors. For instance, assume that one of endpoints 502b executes a particular piece of source code. In such a case, an endpoint agent may export telemetry information regarding the execution of that source code to a host for behavioral anomaly detector 402. In other cases, that same endpoint may also host behavioral anomaly detector 402, to make local assessments of the behaviors of the source code.

Regardless of how behavioral anomaly detector 402 obtains the behavioral data for source code 504, it may employ heuristics or machine learning techniques, to identify anomalous source code 506, based on its behavior. For instance, behavioral anomaly detector 402 may employ k-means clustering, an SVM, or other suitable model to conduct a simple binary classification of the behavior of source code 504. More specifically, behavioral anomaly detector 402 may apply collected livestream states of source code 504 to predict whether it is behaving normally or abnormally/suspiciously. At the beginning, the signature vector database may not have sufficient information, but over time it will become rich. Therefore, the similarity search by using the database will allow this coarse-grained classification accurately.

Once behavioral anomaly detector 402 has identified anomalous source code 506, it may an indication of its findings and/or the code itself, on to sandbox snapshot agent 404 for further testing.

Figure 5B:

As shown in example 510 in FIG. 5B, the role of sandbox snapshot agent 404 is to capture behavioral snapshots of anomalous source code 506 over time. In various implementations, sandbox snapshot agent 404 may do so within a sandbox environment, so as not to cause any disruptions within enterprise network 502. Said differently, the sandbox serves as the diagnostic area that assesses the behavior changes of the contaminated code that contains the malware.

As shown, sandbox snapshot agent 404 may capture n-number of behavioral snapshots 512, such as a first behavioral snapshot 512a at time 514a, a second behavioral snapshot 512b at time 514b, etc., through nth behavioral snapshot 512n at time 514n. To to do so, sandbox snapshot agent 404 may execute anomalous source code 506 and take snapshots of its memory patterns, filesystem patterns, network activities, file descriptor, or the like, over time. In some instances, sandbox snapshot agent 404 may also include an AI agent or interface with one, to present different parameters or scenarios to anomalous source code 506, thereby assessing how anomalous source code 506 responds under different conditions.

Once sandbox snapshot agent 404 has collected a suitable amount of behavioral snapshots 512 (e.g., according to a threshold number of snapshots, after a threshold timespan has elapsed, based on a user-specified setting, etc.), it may pass this information on to prompt generator 406.

Figure 5C:

As shown in example 520 in FIG. 5C, prompt generator 406 may be configured to take as input behavioral snapshots 512 and generate one or more prompts, such as prompt 522. In some instances, prompt generator 406 may also preprocess behavioral snapshots 512, prior to generating prompt 522. For instance, prompt generator 406 may identify components of the input dataset of behavioral snapshots 512, normalize and cluster that data, identify homogeneous data clusters, or the like, prior to generating prompt 522.

In some implementations, prompt generator 406 may also interface with user interface 524, to allow a user to provide input regarding the generation of prompt 522. For instance, in some cases, prompt generator 406 may provide a suggested prompt to user interface 524, to allow the user to approve the prompt or modify, as desired. In other cases, the user may specify one or more parameters that control how prompt generator 406 preprocesses behavioral snapshots 512 and/or generates prompt 522.

The result of prompt generator 406 is a prompt 522 that includes text and/or other media for input to signature generator 408. For instance, prompt 522 may include a request that signature generator 408 begin by determining the unique differences between pairs of behavioral patterns from behavioral snapshots 512 and/or correlation between them. For instance, one potential prompt may take the form: "Given the following behavioral patterns, can you build a correlation between the following two changes?" In addition, prompt 522 may also include the pairs of patterns (e.g., time series data) for analysis by signature generator 408.

In various implementations, signature generator 408 may leverage a large language model (LLM) or other foundation model, to determine the unique differences between the behavioral patterns exhibited by anomalous source code 506. These differences may serve as individual behavioral signatures that signature generator 408 may aggregate into malware signature 526.

Figure 5D:
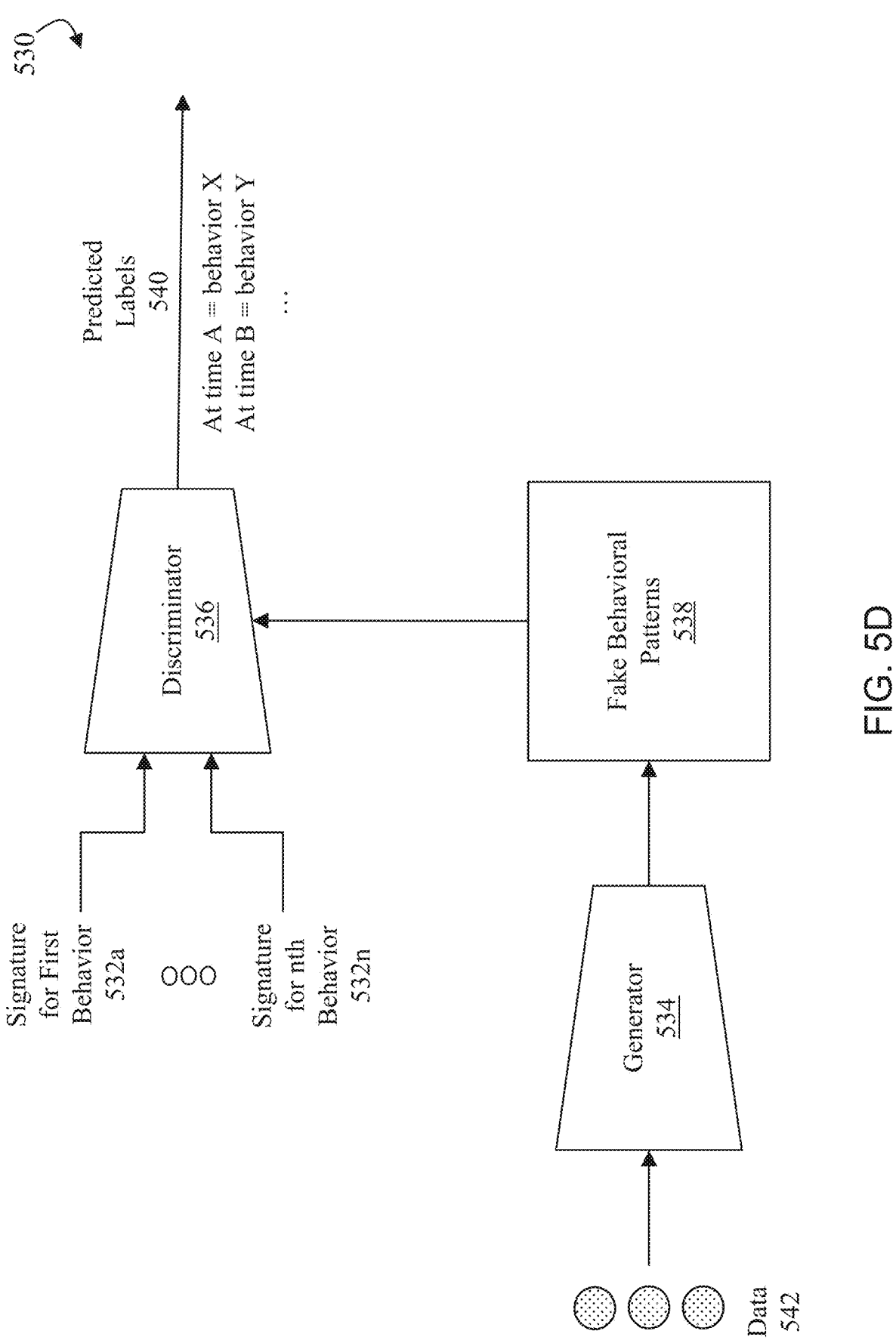

In some implementations, signature generator 408 may aggregate the behavioral signatures into malware signature 526 by leveraging a generative adversarial network (GAN) or other suitable model, to produce a set of predicted behaviors and labels, to serve as malware signature 526. FIG. 5D illustrates an example 530 of signature generator 408 using a GAN to produce malware signature 526.

As shown in FIG. 5D, the GAN may include a generator 534 and a discriminator 536 that operate in conjunction with one another to generate predicted labels 540. For instance, predicted labels 540 may take the form of "at time A, the behavior of anomalous source code 506 will be X, at time B, its behavior will be Y, etc." Here, generator 534 may take as input data 542 (e.g., various parameters, telemetry, etc.) to generate fake behavioral patterns 538. Similarly, discriminator 536 may take as input the behavioral signatures 532 from the LLM and the fake behavioral patterns 538, to output predicted labels 540, which signature generator 408 may use as malware signature 526.

As would be appreciated, malware signature generation process 248 may provide malware signature 526 for use to detect malware in a network such as enterprise network 502 in a variety of ways. In some instances, it may deploy malware signature 526 directly to the anti-malware mechanisms in enterprise network 502, such as to an anti-malware endpoint agent, a network traffic analyzer, or the like. In other cases, malware signature generation process 248 may instead provide malware signature 526 for storage in a repository from which any such anti-malware mechanisms may obtain malware signature 526 (e.g. on a pull or push basis).

Figure 6:
FIG. 6 illustrates an example of storing a malware signature in a vector database.

FIG. 6 illustrates an example 600 of storing a malware signature in a vector database, in some implementations. To do so, an embedding model 602 may take as input malware signature 526, to convert its behavioral labels into vector embeddings 604. Such an embedding model may be a further component of malware signature generation process 248, integrated directly into the vector database service, or take the form of an intermediary. Regardless, embedding model 602 may then provide vector embeddings to vector database 606 for storage.

By storing malware signature 526 as vector embeddings 604 in vector database 606, this allows an application 608 (e.g., an anti-malware application) to perform searches, as part of its anti-malware functions. In addition, it can be used with other AI models to draw comparisons and identify signature polymorphic malware behavioral relationships in polymorphic malware attacks and aid threat response teams in preventing future malware attacks by the use of the advanced insights. For instance, application 608 may issue a query 610 that embedding model 602 converts into corresponding vector embeddings 604, to perform a search of vector database 606. In response, vector database 606 may return response 612 that is indicative of whether there was a match (e.g., that an observed behavior of code in a network matches malware signature 526 and should be blocked, quarantined, etc.).

Figure 7:
FIG. 7 illustrates an example simplified procedure for capturing the behavioral signature of polymorphic malware using generative AI, in accordance with one or more implementations described herein.

FIG. 7 illustrates an example simplified procedure for capturing the behavioral signature of polymorphic malware using generative AI, in accordance with one or more implementations described herein. For example, a non-generic, specifically configured device (e.g., device 200), may perform procedure 700 (e.g., a method) by executing stored instructions (e.g., malware signature generation process 248). The procedure 700 may start at step 705, and continues to step 710, where, as described in greater detail above, the device (e.g., a controller, server, endpoint, etc.) may capture behavioral snapshots of a piece of executable code. In various implementations, the device captures the behavioral snapshots by executing the piece of executable code in a sandbox environment. For instance, the behavioral snapshots may include one or more of: memory access patterns, network activities, or file descriptors. In one implementation, the device uses an artificial intelligence model to capture the behavioral snapshots of the piece of executable code over time. In some implementations, the device captures the behavioral snapshots based on a determination that the piece of code exhibited a behavioral anomaly.

At step 715, as detailed above, the device may generate a prompt based on the behavioral snapshots. In one implementation, the device generates the prompt in part based on input from a user interface.

At step 720, the device may generate a malware signature for the piece of executable code in part by inputting the prompt into a generative model, as described in greater detail above. In various implementations, the generative model is a language model. In some instances, the device may also use an output of the language model as input to a generative adversarial network (GAN) to produce labels for the malware signature.

At step 725, the device may provide the malware signature for use to detect malware, as detailed above. In some cases, the device provides the malware signature for use to detect malware by storing the malware signature in a vector database. In various implementations, an anti-malware endpoint agent or a network traffic analyzer uses the malware signature to detect malware.

Procedure 700 may then end at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for capturing the behavioral signature of polymorphic malware using generative AI, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

capturing, by a device, behavioral snapshots of a piece of executable code that includes a particular type of polymorphic malware;

generating, by the device, a prompt based on the behavioral snapshots that comprises a request to determine a difference or a correlation between the behavioral snapshots;

generating, by the device, a malware signature for the piece of executable code that models behavioral patterns of the particular type of polymorphic malware over time in part by inputting the prompt into a generative model; and providing, by the device, the malware signature for use to detect the particular type of polymorphic malware.

2. The method as in claim 1, wherein the device captures the behavioral snapshots by executing the piece of executable code in a sandbox environment.

3. The method as in claim 1, wherein the behavioral snapshots comprise one or more of: memory access patterns, network activities, or file descriptors.

4. The method as in claim 1, wherein the device uses an artificial intelligence model to capture the behavioral snapshots of the piece of executable code over time.

5. The method as in claim 1, wherein the device captures the behavioral snapshots based on a determination that the piece of executable code exhibited a behavioral anomaly.

6. The method as in claim 1, wherein the generative model is a language model.

7. The method as in claim 6, wherein generating the malware signature for the piece of executable code further comprises:

using, by the device, an output of the language model as input to a generative adversarial network (GAN) to produce labels for the malware signature.

8. The method as in claim 1, wherein the device generates the prompt in part based on input from a user interface.

9. The method as in claim 1, wherein the device provides the malware signature for use to detect malware by storing the malware signature in a vector database.

10. The method as in claim 1, wherein an anti-malware endpoint agent or a network traffic analyzer uses the malware signature to detect malware.

11. An apparatus, comprising:

one or more network interfaces;

a processor coupled to the one or more network interfaces and configured to execute one or more processes; and a memory configured to store a process that is executable by the processor, the process when executed configured to:

capture behavioral snapshots of a piece of executable code that includes a particular type of polymorphic malware;

generate a prompt based on the behavioral snapshots that comprises a request to determine a difference or a correlation between the behavioral snapshots;

generate a malware signature for the piece of executable code that models behavioral patterns of the particular type of polymorphic malware over time in part by inputting the prompt into a generative model; and provide the malware signature for use to detect the particular type of polymorphic malware.

12. The apparatus as in claim 11, wherein the apparatus captures the behavioral snapshots by executing the piece of executable code in a sandbox environment.

13. The apparatus as in claim 11, wherein the behavioral snapshots comprise one or more of: memory access patterns, network activities, or file descriptors.

14. The apparatus as in claim 11, wherein the apparatus uses an artificial intelligence model to capture the behavioral snapshots of the piece of executable code over time.

15. The apparatus as in claim 11, wherein the apparatus captures the behavioral snapshots based on a determination that the piece of executable code exhibited a behavioral anomaly.

16. The apparatus as in claim 11, wherein the generative model is a language model.

17. The apparatus as in claim 16, wherein the apparatus generates the malware signature for the piece of executable code further by:

using an output of the language model as input to a generative adversarial network (GAN) to produce labels for the malware signature.

18. The apparatus as in claim 11, wherein the apparatus generates the prompt in part based on input from a user interface.

19. The apparatus as in claim 11, wherein the apparatus provides the malware signature for use to detect malware by storing the malware signature in a vector database.

20. A tangible, non-transitory, computer-readable medium storing program instructions that cause a device to execute a process comprising:

capturing, by the device, behavioral snapshots of a piece of executable code that includes a particular type of polymorphic malware;

generating, by the device, a prompt based on the behavioral snapshots that comprises a request to determine a difference or a correlation between the behavioral snapshots;

generating, by the device, a malware signature for the piece of executable code that models behavioral patterns of the particular type of polymorphic malware over time in part by inputting the prompt into a generative model; and providing, by the device, the malware signature for use to detect the particular type of polymorphic malware.

* * * * *